(12) United States Patent
Slevin et al.

(10) Patent No.: US 7,899,219 B2
(45) Date of Patent: Mar. 1, 2011

(54) BIOMETRIC CABINET LOCK

(76) Inventors: Richard S. Slevin, Los Altos Hills, CA (US); Margarita K. Slevin, Los Altos Hills, CA (US)

( * ) Notice: Subject to any disclaimer, the term of this patent is extended or adjusted under 35 U.S.C. 154(b) by 1162 days.

(21) Appl. No.: 11/309,676

(22) Filed: Sep. 11, 2006

(65) Prior Publication Data

US 2007/0146117 A1 Jun. 28, 2007

Related U.S. Application Data

(60) Provisional application No. 60/596,246, filed on Sep. 11, 2005.

(51) Int. Cl.
*G06K 9/00* (2006.01)
*G06K 19/00* (2006.01)
*G06F 21/00* (2006.01)

(52) U.S. Cl. .......................... 382/124; 340/5.2; 713/186

(58) Field of Classification Search .................. 382/124
See application file for complete search history.

(56) References Cited

U.S. PATENT DOCUMENTS

| | | | | |
|---|---|---|---|---|
| D366,047 S | * | 1/1996 | Rak et al. | D14/256 |
| D451,501 S | * | 12/2001 | Sward et al. | D14/242 |
| 6,631,201 B1 | * | 10/2003 | Dickinson et al. | 382/124 |
| D493,150 S | * | 7/2004 | Murtaugh et al. | D13/168 |
| D494,969 S | * | 8/2004 | Lin | D14/480.7 |
| 6,788,997 B1 | * | 9/2004 | Frederick | 700/236 |
| 6,804,382 B1 | * | 10/2004 | Dickinson et al. | 382/124 |
| 6,965,294 B1 | * | 11/2005 | Elliott et al. | 340/5.2 |
| 7,040,125 B2 | * | 5/2006 | Ciezki et al. | 70/208 |
| 2003/0046553 A1 | * | 3/2003 | Angelo | 713/186 |
| 2005/0113970 A1 | * | 5/2005 | Holmes et al. | 700/242 |
| 2005/0179517 A1 | * | 8/2005 | Harms et al. | 340/5.9 |
| 2005/0229654 A1 | * | 10/2005 | Victor | 70/58 |
| 2005/0251687 A1 | * | 11/2005 | Bachinski et al. | 713/186 |
| 2005/0269414 A1 | * | 12/2005 | Kell et al. | 235/492 |
| 2006/0016230 A1 | * | 1/2006 | Loughlin et al. | 70/366 |
| 2006/0091995 A1 | * | 5/2006 | Gartner | 340/5.2 |
| 2006/0098848 A1 | * | 5/2006 | Nagasaka et al. | 382/124 |
| 2006/0269051 A1 | * | 11/2006 | Lucas | 379/114.01 |

* cited by examiner

*Primary Examiner*—David P Rashid
(74) *Attorney, Agent, or Firm*—Michael E. Woods

(57) ABSTRACT

A biometric locking system, including a biometric validation module for receiving a biometric profile and asserting a control signal responsive to a biometric evaluation of the biometric profile; an outer cylindrical housing; an inner housing, telescopingly coupled to the outer cylindrical housing, for operating in both an operational mode and a storage mode, the operational mode having the inner housing telescoped out from the outer cylindrical housing and the storage mode having the inner housing telescoped into the outer cylindrical housing wherein the operational mode reveals a biometric scanner coupled to the biometric validation module for creation of the biometric profile by a user and wherein the storage mode covers the biometric scanner.

4 Claims, 3 Drawing Sheets

BIOMETRIC CABINET LOCK

BACKGROUND OF THE INVENTION

The present invention relates generally to biometric locking systems, and more specifically to a fingerprint-controlled locking system adaptable to existing locking solutions.

There are many cabinets, drawers, doors and the like that are locked using conventional lock-and-key solutions. A conventional solution provides for a tumbler locking system coupled to a cam or latch or the like. A small hole in the door or doorjamb reveals a housing of the lock, generally flush, so that use of the key enables a drawer or door to be opened or locked, based upon an interaction of the cam, latch or arm with an element of the door or drawer.

This configuration is very well known and numerous implementations of this lock and key solution are used in an extremely wide range of solutions.

There are known drawbacks of lock-and-key solutions, some of which are addressed by use of various biometric systems that use one or more biometric identifiers (e.g., a fingerprint) to improve security solutions. Unfortunately, these biometric systems are generally incompatible with the conventional solutions employing locks and keys. Users and manufacturers are thus required to use the conventional lock and key solutions without the advantages of the biometric solutions or redesign the myriad of doors, drawers, and the like to use the biometric solutions, or provide for ad hoc retrofit solutions that may not be effective or appropriate from an aesthetic perspective.

What is needed is a solution that permits biometric solutions to be used in place of the conventional tumbler locks, such as those used in standard cabinet and drawer configurations for example.

BRIEF SUMMARY OF THE INVENTION

Disclosed is a biometric locking system, including a biometric validation module for receiving a biometric profile and asserting a control signal responsive to a biometric evaluation of the biometric profile; an outer cylindrical housing; an inner housing, telescopingly coupled to the outer cylindrical housing, for operating in both an operational mode and a storage mode, the operational mode having the inner housing telescoped out from the outer cylindrical housing and the storage mode having the inner housing telescoped into the outer cylindrical housing wherein the operational mode reveals a biometric scanner coupled to the biometric validation module for creation of the biometric profile by a user and wherein the storage mode covers the biometric scanner.

The preferred embodiments of the present invention provide a solution that permits biometric solutions to be used in place of the conventional tumbler locks, such as those used in standard cabinet and drawer configurations. A telescoping interface is provided that is compatible with existing apertures provided for standard tumbler key/lock interfaces and the biometric validation module, responsive to the telescoping interface, controls a mechanical sub-assembly for locking/unlocking, just like the cam or arm or other mechanical elements of the previous non-biometric solutions.

The novel features which are characteristic of the invention, as to organization and method of operation, together with further objects and advantages thereof, will be better understood from the following description considered in connection with the accompanying drawings in which one or more preferred embodiments of the invention are illustrated by way of example. It is to be expressly understood, however, that the drawings are for the purpose of illustration and description only and are not intended as a definition of the limits of the invention. These drawings include the following figures, with like numerals indicating like parts.

DETAILED DESCRIPTION OF THE INVENTION

The present invention relates to a biometric locking system, method, and computer program product that offers the benefits of biometric security to existing enclosure systems while permitting preservation of most aspects of the existing enclosure designs. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
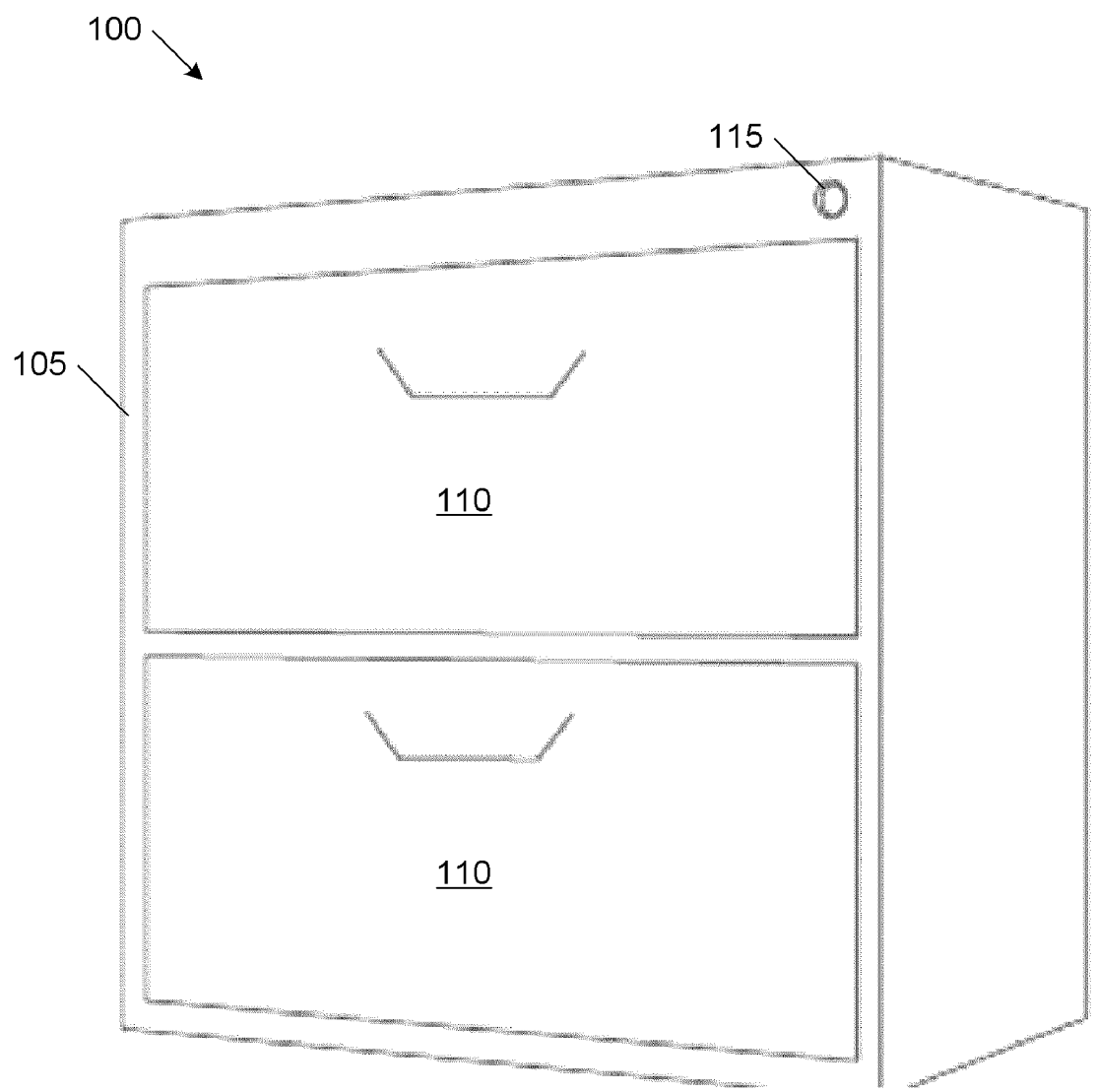
FIG. 1 is a perspective view of a preferred embodiment of a biometric locking system incorporated into a cabinet drawer system.

FIG. 1 is a perspective view of a preferred embodiment of a biometric locking system 100 incorporated into a cabinet drawer system 105 having a plurality of lockable drawers 110. A biometric control 115 is substituted for a conventional lock and key to control access to drawers 110. To simplify the following discussion, a specific locking system (e.g., the cabinet drawer system) is described; but the person of ordinary skill in the art will appreciate that the present invention in general (and the preferred embodiment of biometric control 115 specifically) is adaptable to many different and varied locking systems and controlled access enclosure systems. In the most preferred embodiment, biometric control 115 is configured to be retrofittable into existing mechanical systems using a lock/key system to control a mechanical interface to an interlocking system that controls access to a drawer, a set of drawers, door or doors, openable/closeable enclosures and the like so biometric control 115 thereafter controls the mechanical interface. Other preferred embodiments may provide for changes to the mechanical interface and may adapt an aperture previously used for the keyed locking assembly for biometric control 115.

As described in more detail below, biometric control 115 in the preferred embodiment includes telescoping elements that operate in an operational mode and a storage mode for controlling access to a biometric profile acquisition subsystem (e.g., a fingerprint reader or retinal pattern scanner). This biometric profile acquisition subsystem then provides an appropriate biometric profile to a biometric validation module that controls the mechanical interface to the existing interlocking system. In operation, a user operates biometric control 115 to transition the telescoping elements into the operational mode so the user may access the biometric profile acquisition subsystem. The user passes their finger across a fingerprint reader for example and a scanned fingerprint profile is validated by the biometric validation module to control the interlocking system and unlock one or more drawers 110 of cabinet 105. After accessing the drawer, the user may lock cabinet 105 by using the biometric profile acquisition system again (or in some configurations another option that is in addition to or in lieu of the biometric profile collection and validation—by transitioning the telescoping elements to the storage position).

Figure 2:
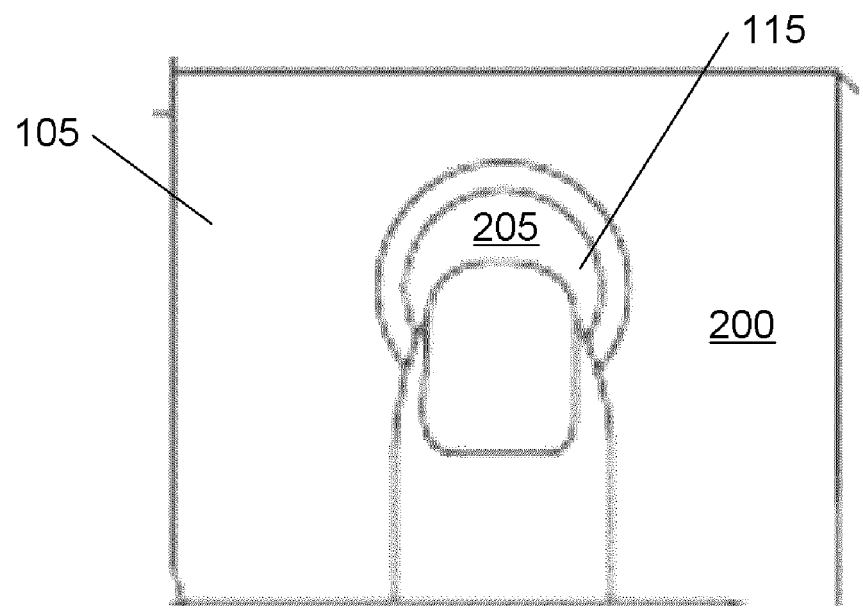
FIG. 2 is a view of the biometric control telescoped into a stored position.

FIG. 2 is a view of biometric control 115 telescoped into a stored position. In the preferred embodiment, the stored position provides for elements of biometric control 115 to be generally flush with the surrounding wall 200 of cabinet 105. A user simply presses an external surface 205 of biometric control 115 while it is in the storage position to transition it to the operational position shown in FIG. 3.

Figure 3:
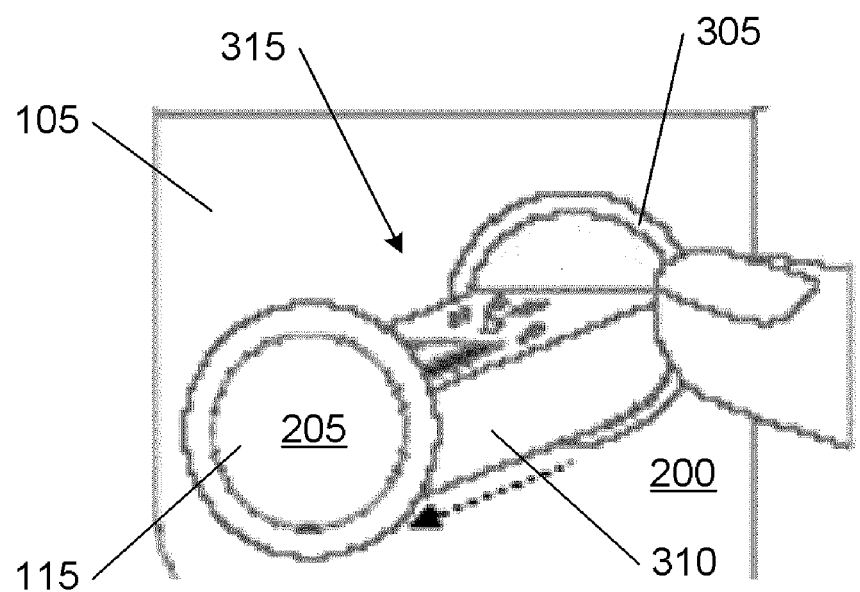
FIG. 3 is a view of the biometric control telescoped out into an operational position.

FIG. 3 is a view of biometric control 115 telescoped out into the operational position. As seen in FIG. 3, biometric control 115 includes an outer housing 305 telescopingly communicated to an inner housing 310, with inner housing 310 supporting a biometric interface 315. As used herein for the discussion of the present invention, telescoping is used in the sense of describing cooperating elements that extend and collapse relative to each other. These elements are shown as generally cylindrical cooperating elements, though other variations and implementations are possible based in part upon the type of aperture in wall 200 (typically these are round but other shapes and profiles are sometimes used such as racetrack/oval-like, rectilinear) and the type of biometric interface 315 used. Outer housing 305 is configured to cooperate with the contours of the aperture in wall 200 and inner housing 310 is configured to cooperate with the outer housing, but they need not have matching contours, just complementary in the sense that outer housing 305 fits within the aperture in wall 200 and inner housing 310 fits within outer housing 305.

The operational mode shown in FIG. 3 permits the user to access biometric interface 315 (such as for example by placing a finger on a fingerprint reader). After accessing biometric interface 315, the user may return biometric control 115 to the storage mode shown in FIG. 2 by again pressing external surface 205 until surface 205 is again generally flush with wall 200.

Figure 4:
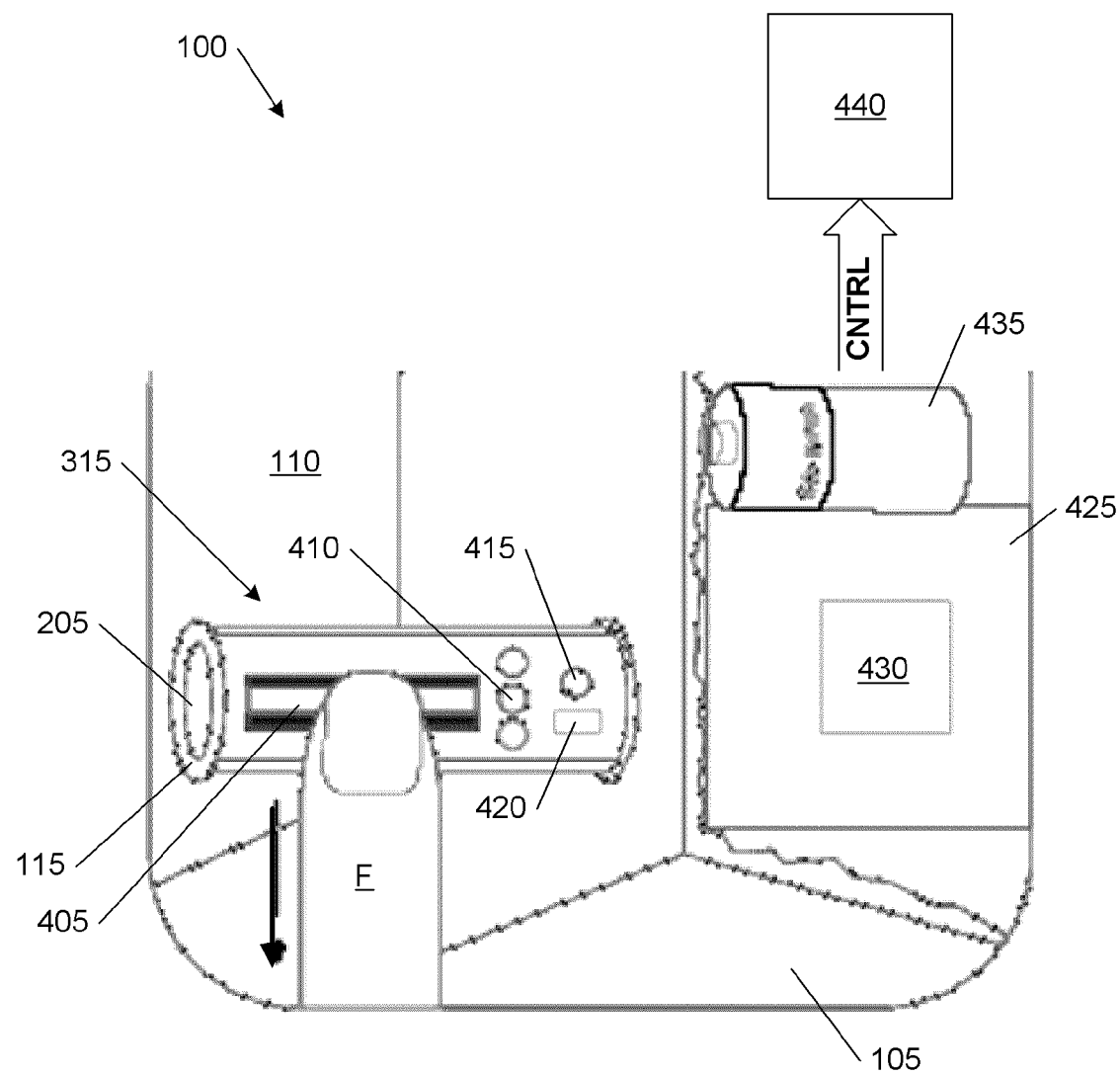
FIG. 4 is a detailed plan view of a preferred embodiment of the biometric locking system implemented into the cabinet drawer system.

FIG. 4 is a detailed plan view of a preferred embodiment of biometric locking system 100 implemented into cabinet drawer system 105. FIG. 4 reveals details of biometric locking system 100 including details of biometric interface 315 and the biometric validation module. Biometric interface 315 of the preferred embodiment includes a fingerprint swipe sensor 405, a set of three interface status indicators 410, a power access port 415, and an infrared (IR) input port 420 for communicating with a fingerprint validation module 425 including a microcontroller 430 and a battery 435 for asserting one or more control signals to a mechanical interface 440.

Sensor 405 is preferably a "swipe" sensor that collects successive "bands" of a fingerprint as a finger F is moved relative to a sensing element as well-known. A swipe sensor is preferred due to the relatively smaller dimensions though other imaging systems may be used. There are many different types of sensors that may be used with a system as an imager including charge-coupled devices (CCD), complementary metal oxide semiconductor (CMOS), capacitive, or other image sensing devices, such as those available from Fujitsu, Atmel, Authentec, ST Micro, for example. Image arrays may be relatively small (e.g., 128×128 pixels to a more common CIF size of 352×288 pixels or larger), each pixel having a pixel depth of but not limited to eight bits but for purposes of the present invention, the imaging device does not produce a complete image of a biometric object in a single capture frame. Of course, biometric interface 315 may be adapted to use other biometric profiles that may be collected from a user, not just fingerprint profile information but using other sensor types. Sensor 405, indicators 410, port 415, and port 420 are communicated to module 425 as described below.

Controller 430 is preferably a microcontroller having processing features and non-volatile memory for storing data and executable instructions for implementing the features and components of the inventions, embodiments, and implementations described herein. Data includes biometric templates for authorized users and the executable instructions for managing system 100. Thus system 100 defines a computing system with a user I/O, processing, and data/program storage and execution capabilities.

Indicators 410 includes three status LEDs: Green, Red, and Amber. Green indicates that the system is ready for finger F to be swiped across sensor 405. After a swipe of finger F, either a double Green Flash indicates a finger match pass or a double Red Flash indicates a failed match. A 20 second flashing Red indicates a low battery condition for battery 435 followed by auto power down. A single Amber LED flashes after a successful swipe prior to a finger ready state. Amber in conjunction with the Green LED indicates excessive false attempts. All three LEDs powered on indicates that the system is in a Registration Mode waiting for a finger input.

System 100 operates using self-contained power—the voltage range is 2.4V to 4V DC. The system operates at 3.3VDC nominally. Current draw varies with power saving features. Typical current draw is 70 ma. Auto-shutoff is enabled at 20 seconds with no activity.

System 100 includes an administrator registration mode: There are two administrators provided for in the preferred embodiment of the user interface. Administrators are defined as the first two fingers to register on a fresh unit or after a delete all stored fingerprint templates. Registration of an administrator is as follows: (In some units: initial power on is initiated by pressing a switch on a mechanical interface 440 board located in an upper left side above battery 435. In other units, sensor 405/system 100 is enabled automatically with pressure from finger F.) All three LED's should be on indicating registration mode. The administrator swipes a target finger across sensor 405 with a medium speed and pressure. The Amber LED will flash or remain on until the finger is removed from sensor 405 before all three LEDs again turn on. The process is repeated for a total of four times. At the end of the fourth finger swipe all three LEDs will flash indicating successful registration or the Red LED will flash indicating a failed registration. In the event of a failed registration, the registration process will automatically begin anew. It is recommended that a second administrator should always be registered. To add the second administrator, follow the Add User procedure below.

Open Lock—by activating mechanical interface 440: Swipe finger F across sensor 405 and module 425 will process the fingerprint image. The Green LED indicates a finger ready state. Mechanical interface 440 will activate to open the interlocking system upon a successful finger match and the Green LED will flash. The Red LED will flash twice for a failed match. The Amber LED will flash on or remain on until the finger is removed from the sensor.

Add users: An administrator must successfully open the lock three successive times after which all three LEDs of indicator 410 will power on indicating registration mode. Using an unregistered finger, swipe the finger across the sensor. The Amber LED will flash or stay on until the finger is removed from the sensor. Wait for all three LEDs to again turn on. Repeat the process for a total of four times. When the Red LED flashes after four successive finger entries, the registration was not successful and will automatically be re-initiated. The registration process is canceled upon detecting a previously registered finger or a successful registration. Each new user must be added by this method.

There are various possible causes for failed registration including inconsistent finger image quality from finger imperfections, wear, or swiping too fast. When there is difficulty registering a finger, a user may try a different finger or otherwise correcting the condition causing the inconsistent image quality.

Erase Stored Fingerprint Templates of Authorized Users: An administrator may delete all user and administrator registrations by successively opening the lock three times (after which all three LEDs will turn on) and successively performing three more successful matches (these will not open the lock) for a total of six times. The unit will then flash all three LEDs, delete all registration information and renter the Administrator Registration process as described above.

Factory Override/Master Key: Each lock is coded with its own unique serial number. Access is granted only through a factory module that access module 425 through IR port 420. It is also possible to provide for a master-key capability for system 100 through IR port 420. That means, as verses the old key locks, the user has ability to update the templates on module 425 through IR port 420. That is, when the user has a great number of locks and one of a group of authorized users leaves or loses a key, the existing locks were required to be replaced or rekeyed. In the preferred embodiment, the user simply uses a PDA with an IR port and uses the proper security code for each lock and to update the templates on the lock. This takes a few seconds only and does not cost anything in keying.

Low Battery indication is by a flashing red LED for 20 seconds followed by auto power down. Port 415 is an external power connector. Port 415 is used when the system runs out of battery power due mostly to a user not observing the low battery warnings from indicator 410. When that is the case, physical access to battery 435 is only available when the system is opened to prevent vandalism. Thus, when battery 435 does not store sufficient power to operate mechanical interface 440, a user plugs in an external power source (e.g., another portable battery) using port 415 and system will operate again using the external power source.

In alternate preferred embodiments, system 100 is not provided with battery 435 and operates solely from power provided through port 415. That is important in a hazardous materials area or just in other situations when the user does not want to have any battery maintenance. In these embodiments the user provides the external power source when desiring to operate the system.

Time Out: After 20 seconds of inactivity, the unit will shut down for preserving power.

Sensor Calibration: The system 100 has a calibration process upon first power up indicated by the solid Amber LED and requires a user to not touch sensor 405 during the calibration process. The system may be placed into calibration mode by performing the Erase Templates procedure above and allowing the biometric interface to self power down after the 20 seconds of non use without reregistering.

Restrict number of false attempts: after six unsuccessful tries, the system enters a special Protected Mode to reduce false accept occurrences. This mode is further described in U.S. Patent application 60/611,238 filed 17 Sep. 2004 and entitled "Method and Apparatus for Enhanced Security in Biometric Systems," the disclosure of which is hereby expressly incorporated in its entirety for all purposes. In this mode, the Green and Amber LEDs turn on solid and two successful matches are required to open a lock. This feature virtually eliminates false accept occurrences. Protected Mode is remembered even after power down and restart allowing the rightful user to determine when anyone has attempted to tamper with the system.

The preferred embodiment of mechanical interface 440 is a low-power piezoelectric device powered by battery 435 that is configured to interoperate with the mechanical interlocking system of the system. It is well-known to configure mechanical interfaces for particular mechanical interlocking systems—moving, rotating, sliding, shifting, and other mechanics for transforming one motion to another are used as appropriate. A preferred piezoelectric device is a servocell available from Servocell Ltd, 1 Astra Centre, Harlow Essex CM20 2BN UK (www.servocell.com). Other devices may be used and adapted to the mechanical interlocking system and module 425 is adapted as appropriate for mechanical interface 440.

Although embodiments of the invention have been described primarily with respect to a fingerprint verification system, any type of fingerprint analysis system may benefit from features of the invention. Other image comparison/processing products such as, for example, retinal scans and machine vision, etc., may similarly benefit from features of the invention.

The biometrics system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the biometrics system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A biometrics system, method, computer program product, and propagated signal embodied in software may be included in a semiconductor intellectual property core (e.g., embodied in HDL) and transformed to hardware in the production of integrated circuits. Additionally, a biometrics system, method, computer program product, and propagated signal as described herein may be embodied as a combination of hardware and software.

One of the preferred implementations of the present invention is as a routine in an operating system made up of programming steps or instructions resident in a memory of a computing system shown in FIG. 1, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, C#, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits may be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Therefore the scope of the invention is to be determined solely by the appended claims.

What is claimed as new and desired to be protected by Letters Patent of the United States is:

1. A biometric locking system for a mechanical interlock, comprising:
   a biometric validation module for receiving a biometric profile and asserting a control signal responsive to a biometric evaluation of said biometric profile;
   an outer housing coupled to a lockable enclosure, said lockable enclosure secured using the mechanical interlock;
   an inner housing, telescopingly coupled to said outer housing, for operating in both an operational mode and a storage mode, said operational mode having said inner housing telescoped out from said outer housing and said storage mode having said inner housing telescoped into said outer cylindrical housing wherein said operational mode reveals a biometric scanner coupled to said biometric validation module for creation of said biometric profile by a user and wherein said storage mode covers said biometric scanner; and
   a mechanical interface, coupled to said biometric validation module and coupled to the mechanical interlock and responsive to said control signal, for controlling a physical locking mode of the mechanical interlock to selectively physically secure and physically unsecure said lockable enclosure.

2. The biometric locking system of claim 1 wherein said biometric scanner includes a fingerprint reader and said biometric profile includes a fingerprint.

3. The biometric locking system of claim 1 wherein said outer housing is generally cylindrical having a diameter less than about one inch.

4. A biometric locking method for a mechanical interlock, the method comprising:
   a) telescoping an inner housing out from an outer housing disposed in a wall of a lockable enclosure, said telescoping moving said inner housing from a storage mode to an operational mode and said lockable enclosure mechanically securable using the mechanical interlock;
   b) revealing a biometric sensor coupled to said inner housing for collecting a biometric profile;
   c) evaluating said biometric profile to control a mechanical interface coupled to the mechanical interlock wherein said lockable enclosure is physically unlocked when said biometric profile is evaluated for an unlocked state and wherein said lockable enclosure is physically locked when said biometric profile is evaluated for a locked state; and
   d) telescoping said inner housing into said outer housing to conceal said biometric sensor.

* * * * *